(12) United States Patent
Blume et al.

(10) Patent No.: US 9,550,887 B2
(45) Date of Patent: Jan. 24, 2017

(54) RUBBER MIXTURES

(75) Inventors: Anke Blume, Weilerswist (DE); Oliver Klockmann, Niederzier (DE); Dörte Kellerhof, Cologne (DE)

(73) Assignee: EVONIK DEGUSSA GMBH, Essen (DE)

( * ) Notice: Subject to any disclaimer, the term of this patent is extended or adjusted under 35 U.S.C. 154(b) by 635 days.

(21) Appl. No.: 13/432,799

(22) Filed: Mar. 28, 2012

(65) Prior Publication Data
US 2012/0251751 A1 Oct. 4, 2012

(30) Foreign Application Priority Data

Apr. 1, 2011 (EP) ..................................... 11160838

(51) Int. Cl.
*C08K 5/544* (2006.01)
*C08K 5/5455* (2006.01)
*C08L 21/00* (2006.01)
*C08L 23/16* (2006.01)

(52) U.S. Cl.
CPC ............. *C08K 5/5455* (2013.01); *C08K 5/544* (2013.01); *C08L 21/00* (2013.01); *C08L 23/16* (2013.01); *Y10T 428/1352* (2015.01)

(58) Field of Classification Search
CPC ....... C08K 5/544; C08K 5/5455; C08L 21/00; C08L 23/16; Y10T 428/1352
USPC ........................................................ 524/212
See application file for complete search history.

(56) References Cited

U.S. PATENT DOCUMENTS

| 4,118,367 | A | 10/1978 | Dawes et al. |
| 6,849,754 | B2 | 2/2005 | Deschler et al. |
| 2009/0186961 | A1 | 7/2009 | Araujo Da Silva et al. |
| 2009/0234066 | A1 | 9/2009 | Araujo Da Silva et al. |
| 2013/0012691 | A1* | 1/2013 | Korth et al. ................... 534/591 |
| 2014/0228479 | A1* | 8/2014 | Darnaud et al. .............. 523/156 |

FOREIGN PATENT DOCUMENTS

| DE | 27 04 506 A1 | 8/1977 |
| DE | 10 2010 00 387 A1 | 9/2011 |
| EP | 1 285 926 A1 | 2/2003 |

* cited by examiner

*Primary Examiner* — Angela C Scott
(74) *Attorney, Agent, or Firm* — Smith, Gambrell & Russell, LLP

(57) ABSTRACT

A rubber mixture, comprising
(A) at least one rubber selected from the group of ethylene-propylene-diene copolymer (EPDM), ethylene-propylene copolymer (EPM), chloroprene rubber (CR), chloropolyethylene (CM), chloro-isobutene-isoprene (chlorobutyl) rubber (CIIR), chlorosulfonyl polyethylene (CSM), etylene-vinyl acetate copolymer (EAM), alkyl acrylate copolymer (ACM), polyester polyurethan (AU), polyether polyurethane (EU), bromo-isobutene-isoprene (bromobutyl)rubber (BIIR), poly-chlorotrifluoroethylene (CFM), isobutene-isoprene rubber (butyl rubber, IIR), isobutene rubber (IM), polyisoprene (IR), thermoplastic polyester polyurethane (YAU), thermoplastic polyether polyurethane (YEU), silicone rubber with methyl groups on the polymer chain (MQ), hydrogenated acrylonitrile-butadiene rubber (HNBR), acrylonitrile-butadiene rubber (NBR) or carboxylated acrylonitrile-butadiene rubber (XNBR),
(B) at least one oxidic filler, and
(C) at least one silicon containing azodicarbamide of the general formula I

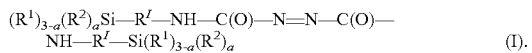

The rubber mixture is produced by mixing at least one rubber, at least one oxidic filler, and at least one silicon containing azodicarbamide of the general formula I.
It may be used for moldings.

10 Claims, No Drawings

RUBBER MIXTURES

The invention relates to rubber mixtures, their production, and their use.

DE 102010003387.1 discloses a process for production of silicon containing azodicarbamides by reaction of $R^3$—$X^1$—C(O)—N=N—C(O)—$X^1$—$R^4$ and $(R^1)_{3-a}(R^2)_a$Si—$R^I$—$NH_2$.

DE 2704506 discloses compounds of the general formula Y—X—CO—N=N—CO—$X^1$—Z and their use in filler containing rubber compounds.

US 20090234066 A1 moreover discloses compounds of the general formula A-CO—N=N—CO—Z-G, which are used together with sulfur containing silanes in isoprene rubber.

US 20090186961 A1 discloses compounds of the general formula A-CO—N=N—CO—Z-G which are used together with coating agents in isoprene rubber.

A disadvantage of the known rubber mixtures, comprising organo(alkylpolyethersilanes), is the bad dynamic behavior including a high hysteresis loss.

It is an object of the invention to provide rubber mixtures which have an improved dynamic behavior including an outstanding low hysteresis loss after vulcanization.

The invention provides rubber mixtures which are characterized in that they comprise (A) at least one rubber selected from the group of ethylene-propylene-diene copolymer (EPDM), ethylene-propylene copolymer (EPM), chloroprene rubber (CR), chloropolyethylene (CM), chloro-isobutene-isoprene (chlorobutyl) rubber (CIIR), chlorosulfonyl polyethylene (CSM), etylene-vinyl acetate copolymer (EAM), alkyl acrylate copolymer (ACM), polyester polyurethan (AU), polyether polyurethane (EU), bromo-isobutene-isoprene (bromobutyl)rubber (BIIR), polychlorotrifluoroethylene (CFM), isobutene-isoprene rubber (butyl rubber, IIR), isobutene rubber (IM), polyisoprene (IR), thermoplastic polyester polyurethane (YAU), thermoplastic polyether polyurethane (YEU), silicone rubber with methyl groups on the polymer chain (MQ), hydrogenated acrylonitrile-butadiene rubber (HNBR), acrylonitrile-butadiene rubber (NBR) or carboxylated acrylonitrile-butadiene rubber (XNBR), preferably ethylene-propylene-diene copolymer (EPDM), (B) at least one oxidic filler, and (C) at least one silicon containing azodicarbamide of the general formula I $$(R^1)_{3-a}(R^2)_a\text{Si}—R^I—\text{NH}—\text{C(O)}—\text{N}=\text{N}—\text{C(O)}—\text{NH}—R^I—\text{Si}(R^1)_{3-a}(R^2)_a \quad (I),$$

where $R^1$ are independent from each other substituted or oder unsubstituted C1-C18-, preferably C1-C10-, more preferably C1-C6-, most preferably C1-, alkyl groups, C5-C18-, preferably C6-, cycloalkyl groups, or C6-C18-aryl groups, preferably phenyl, $R^2$ is independent from each other a —OH, a substituted or unsubstituted C1-C18-alkoxy group, preferably $CH_3$—O—, $C_2H_5$—O—, $C_3H_7$—O—, $C_{12}H_{25}$—O—, $C_{14}H_{29}$—O—, $C_{16}H_{33}$—O—, $C_{18}H_{37}$—O—, more preferably $C_2H_5$—O—, a C5-C18-cycloalkoxy group, or an alkyl polyether group $O(CH_2$—$CH_2$—$O)_n$—$R^3$ or $O(CH(CH_3)$—$CH_2$—$O)_n$—$R^3$, where the average of n is from 1 to 18 and $R^3$ is mutually independently a branched or unbranched, saturated or unsaturated monovalent C1-C32-hydrocarbon chain, $R^I$ is a branched or unbranched saturated or unsaturated, aliphatic, aromatic oder mixed aliphatic/aromatic divalent C1-C30-, preferably C1-C20-, more preferably C1-C10-, most preferably C1-C7-, hydrocarbon which can be substituted with F—, Cl—, Br—, I—, —CN or HS— if needed, a=1, 2 or 3 independent from each other.

$R^I$ can be preferably —$CH_2$—, —$CH_2CH_2$—, —$CH_2CH_2CH_2$—, —$CH_2CH_2CH_2CH_2$—, —$CH(CH_3)$—, —$CH_2CH(CH_3)$—, —$CH(CH_3)CH_2$—, —$C(CH_3)_2$—, —$CH(C_2H_5)$—, —$CH_2CH_2CH(CH_3)$—, —$CH(CH_3)CH_2CH_2$—, —$CH_2CH(CH_3)CH_2$—, —$CH_2CH_2CH_2CH_2CH_2$—, —$CH_2CH_2CH_2CH_2CH_2CH_2$—, —$CH_2CH_2CH_2CH_2CH_2CH_2CH_2$—, —$CH_2CH_2CH_2CH_2CH_2CH_2CH_2CH_2$—, —$CH_2CH_2CH_2CH_2CH_2CH_2CH_2CH_2CH_2$—, —$CH_2CH_2CH_2CH_2CH_2CH_2CH_2CH_2CH_2CH_2$—, —$CH_2CH_2CH_2CH_2CH_2CH_2CH_2CH_2CH_2CH_2CH_2$—, —$CH_2CH_2CH_2CH_2CH_2CH_2CH_2CH_2CH_2CH_2CH_2CH_2$—, —$CH_2CH_2CH_2CH_2CH_2CH_2CH_2CH_2CH_2CH_2CH_2CH_2CH_2$—, —$CH_2CH_2CH_2CH_2CH_2CH_2CH_2CH_2CH_2CH_2CH_2CH_2CH_2CH_2$—, —$CH_2CH_2CH_2CH_2CH_2CH_2CH_2CH_2CH_2CH_2CH_2CH_2CH_2CH_2CH_2CH_2$—, —$CH_2CH_2CH_2CH_2CH_2CH_2CH_2CH_2CH_2CH_2CH_2CH_2CH_2CH_2CH_2CH_2CH_2CH_2$—,

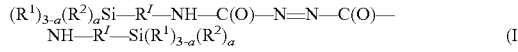

or —$CH_2$—$CH_2$—$C_6H_4$—$CH_2$—.

Silicon containing azodicarbamide of the general formula I can be preferentially:

$(EtO)_3Si$—$CH_2$—NH—CO—N=N—CO—NH—$CH_2$—$Si(OEt)_3$, $(EtO)_3Si$—$CH_2$—$CH_2$—NH—CO—N=N—CO—NH—$CH_2$—$CH_2$—$Si(OEt)_3$, $(EtO)_3Si$—$CH_2$—$CH_2$—$CH_2$—NH—CO—N=N—CO—NH—$CH_2$—$CH_2$—$CH_2$—$Si(OEt)_3$, $(EtO)_3Si$—$CH_2$—$CH_2$—$CH_2$—$CH_2$—NH—CO—N=N—CO—NH—$CH_2$—$CH_2$—$CH_2$—$CH_2$—$Si(OEt)_3$, $(EtO)_3Si$—$(CH_2)_{11}$—NH—CO—N=N—CO—NH—$(CH_2)_{11}$—$Si(OEt)_3$, $(EtO)_3Si$—$(CH_2)_{12}$—NH—CO—N=N—CO—NH—$(CH_2)_{12}$—$Si(OEt)_3$, $(EtO)_3Si$—$CH_2CH(CH_3)CH_2$—NH—CO—N=N—CO—NH—$CH_2CH(CH_3)CH_2$—$Si(OEt)_3$, $(EtO)_3Si$—$CH_2$—$CH_2$—$C_6H_4$—$CH_2$—NH—CO—N=N—CO—NH—$CH_2$—$C_6H_4$—$CH_2$—$CH_2$—$Si(OEt)_3$, $(EtO)_3Si$—$CH_2$—$CH_2$—$C_6H_4$—NH—CO—N=N—CO—NH—$C_6H_4$—$CH_2$—$CH_2$—$Si(OEt)_3$, $(MeO)_3Si$—$CH_2$—NH—CO—N=N—CO—NH—$CH_2$—$Si(OMe)_3$, $(MeO)_3Si$—$CH_2$—$CH_2$—NH—CO—N=N—CO—NH—$CH_2$—$CH_2$—$Si(OMe)_3$, $(MeO)_3Si$—$CH_2$—$CH_2$—$CH_2$—NH—CO—N=N—CO—NH—$CH_2$—$CH_2$—$CH_2$—$Si(OMe)_3$, $(MeO)_3Si$—$CH_2$—$CH_2$—$CH_2$—$CH_2$—NH—CO—N=N—CO—NH—$CH_2$—$CH_2$—$CH_2$—$CH_2$—$Si(OMe)_3$, $(MeO)_3Si$—$(CH_2)_{11}$—NH—CO—N=N—CO—NH—$(CH_2)_{11}$—$Si(OMe)_3$, $(MeO)_3Si$—$(CH_2)_{12}$—NH—CO—N=N—CO—NH—$(CH_2)_{12}$—$Si(OMe)_3$, $(MeO)_3Si$—$CH_2CH(CH_3)CH_2$—NH—CO—N=N—CO—NH—$CH_2CH(CH_3)CH_2$—$Si(OMe)_3$, (MeO)₃Si—CH₂—CH₂—C₆H₄—CH₂—NH—CO—
 N=N—CO—NH—CH₂—C₆H₄—CH₂—CH₂—Si
 (OMe)₃,
(MeO)₃Si—CH₂—CH₂—C₆H₄—NH—CO—N=N—
 CO—NH—C₆H₄—CH₂—CH₂—Si(OMe)₃,
(EtO)(RO)₂Si—CH₂—CH₂—CH₂—NH—CO—N=N—
 CO—NH—CH₂—CH₂—CH₂—Si(EtO)(RO)₂ or
(RO)(EtO)₂Si—CH₂—CH₂—CH₂—NH—CO—N=N—
 CO—NH—CH₂—CH₂—CH₂—Si(RO)(EtO)₂
with Me=methyl, Et=ethyl and R=C₁₃H₂₇(OCH₂CH₂)₅.

The silicon containing azodicarbamide of the general formula I

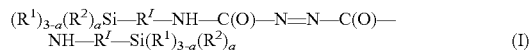   (I)

can be produced by reaction of azobiscarboxy compounds of the general formula II $$R^5—X^1—C(O)—N=N—C(O)—X^1—R^4 \quad (II)$$

with aminosilanes of the general formula III

   (III), where

R¹, R², R^I and a have the same meaning as above mentioned and

X¹ are mutually independently O, NH or N-A¹, where A¹ is C1-C12-alkyl group or aryl group and R⁴ and R⁵ are mutually independently an H, a C1-C18-alkyl group, a benzyl group (—CH₂—C₆H₅) or an alkyl polyether group (CH₂—CH₂—O)ₘ—R⁵ or (CH(CH₃)—CH₂—O)ₘ—R⁵, where the average of m is from 1 to 18. The reaction conditions are described in DE 10 2010 003 387.1.

The aminosilanes of the general formula III with R²=alkyl polyether group O(CH₂—CH₂—O)ₙ—R³ or O(CH(CH₃)—CH₂—O)ₙ—R³ can be produced by transesterification of aminosilanes of the general formula III with R²=—OH, a substituted or unsubstituted C1-C18-alkoxy group or a C5-C18-cycloalkoxy group with HO(CH₂—CH₂—O)ₙ—R³ or HO(CH(CH₃)—CH₂—O)ₙ—R³. The reaction conditions of the transesterification are for example described in EP 1 285 926 A1.

The silicon containing azodicarbamide of the general formula I can alternatively be produced by transesterification of silicon-containing azo-dicarbamides of the general formula I of DE 10 2010 003 387.1. The reaction conditions of the transesterification are for example described in EP 1 285 926 A1.

The silicon containing azodicarbamide can be a mixture composed of silicon containing azodicarbamides of the general formula I.

The rubber mixtures of the invention can additionally contain oligomers, which are generated by hydrolysis or condensation of silicon containing azodicarbamides of the general formula I.

The silicon containing azodicarbamide of the general formula I can either be added in pure form to the mixing process or else added in a form absorbed onto an inert organic or inorganic carrier, or else a form prereacted with an organic or inorganic carrier. Preferred carrier materials can be precipitated or fumed silicas, waxes, thermoplastics, natural or synthetic silicates, natural or synthetic oxides, such as aluminum oxide, or carbon blacks. The silicon containing azodicarbamide of the general formula I can also be added to the mixing process in a form prereacted with the oxidic filler to be used.

Preferred waxes can be waxes with melting points, melting ranges, or softening ranges from 50° to 200° C., preferably from 70° to 180° C., particularly preferably from 90° to 150° C., very particularly preferably from 100° to 120° C.

The waxes used can be olefinic waxes.

The waxes used can contain saturated and unsaturated hydrocarbon chains.

The waxes used can comprise polymers or oligomers, preferably emulsion SBR or/and solution SBR.

The waxes used can comprise long-chain alkanes or/and long-chain carboxylic acids.

The waxes used can comprise ethylene-vinyl acetate and/or polyvinyl alcohols.

The silicon containing azodicarbamide of the general formula I can be added to the mixing process in a form physically mixed with an organic substance, or physically mixed with an organic substance mixture.

The organic substance or the organic substance mixture can comprise polymers or oligomers.

Polymers or oligomers can be heteroatom-containing polymers or oligomers, for example ethylene-vinyl alcohol or/and polyvinyl alcohols.

The following oxidic fillers can be used for the rubber mixtures of the invention:

Amorphous silicas, prepared by way of example via precipitation of solutions of silicates (precipitated silicas) or flame hydrolysis of silicon halides (fumed silicas). The specific surface areas of the amorphous silicas can be from 5 to 1000 m²/g, preferably from 20 to 400 m²/g (BET surface area) and their primary particle sizes can be from 10 to 400 nm. The silicas can, if appropriate, also take the form of mixed oxides with other metal oxides, such as Al oxides, Mg oxides, Ca oxides, Ba oxides, Zn oxides and titanium oxides.

Synthetic silicates, such as aluminum silicate or alkaline earth metal silicates, such as magnesium silicate or calcium silicate. The BET surface areas of the synthetic silicates can be from 20 to 400 m²/g and their primary particle diameters can be from 10 to 400 nm.

Synthetic or natural aluminum oxides and synthetic or natural aluminum hydroxides.

Natural silicates, such as kaolin and other naturally occurring silicas.

Glass fiber and glass fiber products (mats, strands) or glass microbeads.

It may be preferable to use amorphous silicas prepared via precipitation of solutions of silicates (precipitated silicas) with BET surface areas of from 20 to 400 m²/g. The amounts that can be used of the amorphous silicas are from 5 to 150 parts by weight, based in each case on 100 parts of rubber (phr).

The fillers mentioned can be used alone or in a mixture.

In one particularly preferred embodiment, the rubber mixtures can comprise from 10 to 150 parts by weight of oxidic fillers, if appropriate together with from 0 to 100 parts by weight of carbon black, and also from 1 to 20 parts by weight of silicon containing azodicarbamide of the general formula I, based in each case on 100 parts by weight of rubber.

Additional fillers that can be used are carbon blacks, such as flame black, furnace black, gas black, or thermal black, or synthetic or natural calcium carbonates, such as precipitated calcium carbonate. The BET surface area of the carbon blacks can be from 20 to 200 m²/g. The carbon blacks can, if appropriate, also contain heteroatoms, such as Si.

The preferred material for preparation of the inventive rubber mixtures is ethylene-propylene-diene copolymer (EPDM) which can contain a third monomer (ethylene-propylen-terpolymer).

The inventive rubber mixtures can contain additionally natural rubber or synthetic rubbers. Preferred synthetic rubbers are described by way of example in W. Hofmann, Kautschuktechnologie [Rubber technology], Genter Verlag, Stuttgart 1980. They comprise, inter alia polybutadiene (BR);
polyisoprene (IR);
styrene-butadiene copolymers (SBR), such as emulsion SBR (E-SBR) or solution SBR (S-SBR). The styrene-butadiene copolymers can have styrene content of from 1 to 60% by weight, preferably from 2 to 50% by weight, particularly preferably from 10 to 40% by weight, very particularly preferably from 15 to 35% by weight;
chloroprene (CR);
isobutylene-isoprene copolymers (IIR);
butadiene-acrylonitrile copolymers whose acrylo-nitrile contents are from 5 to 60% by weight, preferably from 10 to 50% by weight (NBR), particularly preferably from 10 to 45% by weight (NBR), very particularly preferably from 19 to 45% by weight (NBR);
partially hydrogenated or fully hydrogenated NBR rubber (HNBR);
abovementioned rubbers which also have functional groups, e.g. carboxy groups, silanol groups or epoxy groups, e.g. epoxidized NR, carboxy-functionalized NBR or silanol- (—SiOH) or silyl-alkoxy-functionalized (—Si—OR) SBR;
or a mixture of these rubbers.

The inventive rubber mixtures can comprise other rubber auxiliaries, such as reaction accelerators, antioxidants, heat stabilizers, light stabilizers, anti-ozonants, processing aids, plasticizers, tackifiers, blowing agents, dyes, pigments, waxes, extenders, organic acids, retarders, metal oxides, and also activators, such as triethanolamine or hexanetriol.

The rubber mixture of the invention can comprise further silanes. Further silanes that can be added to the rubber mixtures of the invention are mercapto-organylsilanes containing ethoxysilyl groups, or/and thiocyanato-organylsilanes containing ethoxy-silyl groups,
or/and blocked mercapto-organylsilanes containing ethoxysilyl groups,
or/and polysulfidic alkoxysilanes containing ethoxysilyl groups.

Further silanes that can be added to the rubber mixtures of the invention are mercapto-organyl(alkoxy-silanes) having $C_8H_{17}$—O—, $C_{10}H_{21}$—O—, $C_{12}H_{25}$—O—, $C_{14}H_{29}$—O—, $C_{16}H_{33}$—O—, or $C_{18}H_{37}$—O— groups on silicon.

Further silanes that can be added to the rubber mixtures of the invention are thiocyanato-organyl (alkoxysilanes) having $C_8H_{17}$—O—, $C_{10}H_{21}$—O—, $C_{12}H_{25}$—O—, $C_{14}H_{29}$—O—, $C_{16}H_{33}$—O—, or $C_{18}H_{37}$—O— groups on silicon.

Further silanes that can be added to the rubber mixtures of the invention are blocked mercapto-organyl (alkoxysilanes) having $C_8H_{17}$—O—, $C_{10}H_{21}$—O—, $C_{12}H_{25}$—O—, $C_{14}H_{29}$—O—, $C_{16}H_{33}$—O—, or $C_{18}H_{37}$—O— groups on silicon.

Further silanes that can be added to the rubber mixtures of the invention are blocked mercapto-organyl(alkoxysilanes) having difunctional alcohols (diols) on silicon (e.g. NXT LowV or NXT Ultra-LowV from General Electric).

Further silanes that can be added to the rubber mixtures of the invention are polysulfidic alkoxy-silanes having $C_8H_{17}$—O—, $C_{10}H_{21}$—O—, $C_{12}H_{25}$—O—, $C_{14}H_{29}$—O—, $C_{16}H_{33}$—O—, or $C_{18}H_{37}$—O— groups on silicon.

Further silanes that can be added to the rubber mixtures of the invention are polysulfidic alkoxy-silanes of the formulae EtO—Si(Me)$_2$-CH$_2$—CH$_2$—CH$_2$—S$_2$—CH$_2$—CH$_2$—CH$_2$—Si(Me)$_2$(OEt),
EtO—Si(Me)$_2$-CH$_2$—CH$_2$—CH$_2$—S$_3$—CH$_2$—CH$_2$—CH$_2$—Si(Me)$_2$(OEt), or
EtO—Si(Me)$_2$-CH$_2$—CH$_2$—CH$_2$—S$_4$—CH$_2$—CH$_2$—CH$_2$—Si(Me)$_2$(OEt).

Further silanes that can be added to the rubber mixtures of the invention are 3-mercaptopropyl(tri-ethoxysilane) (for example Si 263 from Evonik Degussa GmbH), 3-thiocyanatopropyl(triethoxysilane) (for example Si 264 from Evonik Degussa GmbH), bis(triethoxysilylpropyl) polysulfide (for example Si 69 from Evonik Degussa GmbH), bis(triethoxysilylpropyl)disulfide (for example Si 266 from Evonik Degussa GmbH).

Further silanes that can be added to the rubber mixtures of the invention are alkylpolyether-alcohol-containing mercapto-organylsilanes (such as Si 363 from Evonik Degussa GmbH),
or/and alkylpolyether-alcohol-containing thiocyanato-organylsilanes,
or/and alkylpolyether-alcohol-containing, blocked mercapto-organylsilanes,
or/and alkylpolyether-alcohol-containing, polysulfidic silanes.

It can be desirable for reasons of economics or of rubber technology to minimize the necessary or desirable proportion of further silanes.

The amounts used of the rubber auxiliaries can be known amounts, depending inter alia on the intended purpose. As a function of the processing aid used, conventional amounts can be amounts of from 0.001 to 50% by weight, preferably from 0.001 to 30% by weight, particularly preferably from 0.01 to 30% by weight, very particularly preferably from 0.1 to 30% by weight, based on rubber (phr).

The rubber mixtures of the invention can be sulfur-vulcanizable rubber mixtures.

The rubber mixtures of the invention can be peroxidically crosslinkable rubber mixtures.

Crosslinking agents that can be used are sulfur or sulfur-donor substances. The amounts used of sulfur can be from 0.1 to 10% by weight, preferably from 0.1 to 5% by weight, based on rubber.

The silicon containing azodicarbamide of the general formula I can be used as adhesion promoter between inorganic materials (e.g. glass beads, glass splinters, glass surfaces, glass fibers, metals, oxidic fillers, silicas) and organic polymers (e.g. thermosets, thermoplastics, elastomers), or as crosslinking agent and surface modifier for oxidic surfaces. The silicon containing azodicarbamide of the general formula I can be used as coupling reagents in filled rubber mixtures, an example being seals.

It can be desirable for reasons of economics or of rubber technology to minimize the necessary or desirable proportion of rubber auxiliaries.

The rubber mixtures of the invention can comprise further vulcanization accelerators.

Amounts that can be used of the vulcanization accelerators are from 0.1 to 10% by weight, preferably from 0.1 to 5% by weight, based on the rubber used.

The rubber mixtures of the invention can comprise
(D) a thiuram sulfide accelerator and/or a carbamate accelerator and/or a mercaptobenzothiazole and/or a dithiophosphate and/or the corresponding zinc salts,
(E) if appropriate, a nitrogen-containing coactivator, and
(F) if appropriate, further rubber auxiliaries.

The invention further provides a process for the production of the rubber mixtures of the invention, which is characterized in that the process comprises mixing at least one rubber selected from the group of ethylene-propylene-diene copolymer (EPDM), ethylene-propylene copolymer (EPM), chloroprene rubber (CR), chloropolyethylene (CM), chloro-isobutene-isoprene (chlorobutyl) rubber (CIIR), chlorosulfonyl polyethylene (CSM), etylene-vinyl acetate copolymer (EAM), alkyl acrylate copolymer (ACM), polyester polyurethan (AU), polyether polyurethane (EU), bromo-isobutene-isoprene (bromobutyl)rubber (BIIR), polychlorotrifluoroethylene (CFM), isobutene-isoprene rubber (butyl rubber, IIR), isobutene rubber (IM), polyisoprene (IR), thermoplastic polyester polyurethane (YAU), thermoplastic polyether polyurethane (YEU), silicone rubber with methyl groups on the polymer chain (MQ), hydrogenated acrylonitrile-butadiene rubber (HNBR), acrylonitrile-butadiene rubber (NBR) or carboxylated acrylonitrile-butadiene rubber (XNBR), preferably ethylene-propylene-diene copolymer (EPDM), at least one oxidic filler, and at least one silicon containing azodicarbamide of the general formula I.

The process of the invention can be carried out at temperatures >25° C.

The process of the invention can be carried out in the temperature range from 80° C. to 220° C., preferably from 100° C. to 200° C., particularly preferably from 110° C. to 180° C.

The process can be carried out continuously or batchwise.

The addition of the silicon containing azodicarbamide of the general formula I, and also the addition of the fillers, can take place when the temperatures of the composition are from 100 to 220° C. However, it can also take place at lower temperatures of from 40 to 100° C., e.g. together with further rubber auxiliaries.

The blending of the rubbers with the filler and, if appropriate, with rubber auxiliaries and with the silicon containing azodicarbamide of the general formula I can take place in or on conventional mixing assemblies, such as rolls, internal mixers, and mixing extruders. These rubber mixtures can usually be produced in internal mixers, beginning with one or more successive thermomechanical mixing stages in which the rubbers, the filler, the silicon containing azodicarbamide of the general formula I and the rubber auxiliaries are incorporated by mixing at from 100 to 180° C. The sequence of addition and the juncture of addition of the individual components here can have a decisive effect on the resultant properties of the mixture. The crosslinking chemicals can usually be admixed in an internal mixer or on a roll at from 40 to 110° C. with the rubber mixture thus obtained, and processed to give what is known as a crude mixture for the subsequent steps of the process, for example shaping and vulcanization.

Vulcanization of the rubber mixtures of the invention can take place at temperatures of from 80 to 220° C., preferably from 130 to 190° C., if appropriate under a pressure of from 10 to 200 bar.

The rubber mixtures of the invention can be used for the production of seals, vibrators, glass-run channels, radiators, garden and appliance hoses, tubings, washers, belts, electrical insulations, and speaker cone surrounds, in electrical cable-jointings, profiles, outer casing on wires, roofing membranes, geomembranes, rubber mechanical goods, plastic impact modifications, thermoplastic, vulcanizates and many other applications. The rubber mixtures of the invention can be used for weatherseals on all vehicles. This includes door seals, window seals, trunk seals, and hood seals.

The rubber mixtures of the invention can be used in cooling system circuit hoses in an automobile.

Additionally, it can be used as charge air tubings on turbo charged engines.

The invention further provides moldings obtainable from the rubber mixture of the invention, via vulcanization.

The rubber mixtures of the invention have the advantage of an improved dynamic behavior with an outstanding low hysteresis loss.

EXAMPLES

The following compounds are used in rubber mixtures:
Compounds for the Comparative Examples:
Compound 1: Carbon Black Corax® N 550 from Evonik Carbon Black GmbH.
Compound 2: Bis(triethoxysilylpropyl)disulfide is obtainable as Si 266® from Evonik Degussa GmbH.
Compound for the Example of the Invention:
Compound 3: $(EtO)(RO)_2Si-CH_2-CH_2-CH_2-NH-CO-N=N-CO-NH-CH_2-CH_2-CH_2-Si(EtO)(RO)_2$ with Et=ethyl and $R=C_{13}H_{27}(OCH_2CH_2)_5$ prepared by a method based on the process described in DE 10 2010 003 387.1:

Under argon atmosphere 100 g 3-aminopropyl(triethoxysilane) (451 mmol) and ethoxylated isotridecanol (903 mmol) are mixed and heated to 130° C. Under vacuum (400 mbar abs), ethanol (903 mmol) is distilled off. The product is dissolved in n-pentane and cooled to 0° C. Under stirring, DIAD (Diisopropylazodicarboxylate; molar ratio 1:2 DIAD/silane) is dosed into the solution while maintaining the temperature between −5° C. and 5° C. After that, the solution is stirred for 30 min at 0° C. and then for 180 min at room temperature. Volatiles (pentane, isopropanol) are removed on a rotary evaporator under vacuum (until 6 mbar abs).

The product is obtained in >99% yield as a bright red viscous liquid with a purity of the target substance >85 mol-% (NMR).

Example 1

Rubber mixtures

The main mixing specification used for the rubber mixtures is stated in table 1 below. The phr unit used there is proportions by weight, based on 100 parts of the crude rubber used.

The general process for the production of rubber mixtures and their vulcanizates is described in the book: "Rubber Technology Handbook", W. Hofmann, Hanser Verlag 1994.

TABLE 1

Main mixing specification

| | Amount added [phr] | Amount added [phr] | Amount added [phr] |
|---|---|---|---|
| Mixture | 1 (ref.) | 2 (ref.) | 3 (inv.) |
| 1$^{st}$ stage | | | |
| Buna ® EP G 5455 | 150 | 150 | 150 |
| Corax ® N 550 | 130 | 0 | 0 |
| ULTRASIL ® 7000 GR | 0 | 150 | 150 |
| Si 266 ® | 0 | 10 | 0 |
| Compound 3 | 0 | 0 | 10 |
| Stearic acid | 2 | 2 | 2 |

TABLE 1-continued

| Main mixing specification | | | |
|---|---|---|---|
| | Amount added [phr] | Amount added [phr] | Amount added [phr] |
| Lipoxol 4000 | 2 | 2 | 2 |
| Sunpar 150 | 50 | 50 | 50 |
| 2nd stage | | | |
| Batch stage 1 | | | |
| 3rd stage | | | |
| Batch stage 2 | | | |
| Vulkacit Mercapto C | 1 | 1 | 1 |
| Perkacit TBzTD | 1.2 | 1.2 | 1.2 |
| Rhenocure TP/S | 2 | 2 | 2 |
| Sulfur | 1.5 | 1.5 | 1.5 |
| ZnO | 5 | 5 | 5 |

The polymer Buna® EP G 5455 is an ethylen-propylen-terpolymer with a medium unsaturation (ENB content=4,3) containing 50 phr paraffinic oil from Lanxess. Its Mooney viscosity (UML (1+4) 125° C.) is 46.

ULTRASIL® 7000 GR is a highly dispersible silica from Evonik Degussa GmbH, its BET surface area being 170 m$^2$/g.

Lipoxol 4000 from Sasol is a polyethylene glycol 4000, Sunpar 150 from Holly Corporation is a paraffinic oil, Vulkacit Mercapto C from Lanxess is 2-mercaptobenzothiazole (MBT), Perkacit TBzTD (tetrabenzylthiuram tetrasulfide) is a product from Flexsys N.V, Rhenocure TP/S from RheinChemie is 67% zinc dialkyldithiophosphate bound to 33% silica.

The rubber mixtures are produced in an internal mixer in accordance with the mixing specification in table 2.

TABLE 2

| Stage 1 | |
|---|---|
| Settings | |
| Mixing assembly | Werner & Pfleiderer type E |
| Rotation rate | 80 min$^{-1}$ |
| Ram pressure | 5.5 bar |
| Capacity | 1.58 L |
| Fill level | 0.56 |
| Chamber temp. | 80° C. |
| Mixing procedure | |
| 0 to 0.5 min | EPDM |
| 0.5 to 1 min | mixing |
| 1 to 2 min | ½ silica, silan |
| 2 min | Purge, aerate |
| 2 to 3 min | Add remaining components of stage 1 |
| 3 min | Purge, aerate |
| 3 to 4 min | Mix, maintain batch temperature 155° C. via variation of the rotation rate |
| 4 min | Discharge |
| Batch temp. | 150-160° C. |
| Storage | 24 h at room temperature |
| Stage 2 | |
| Settings | |
| Mixing assembly | As in stage 1, except: |
| Chamber temp. | 90° C. |
| Fill level | 0.53 |
| Mixing procedure | |
| 0 to 1 min | Break up stage 1 batch |
| 1 to 3 min | Maintain 155° C. batch temperature via rotation rate variation |
| 3 min | Discharge |
| Batch temp. | 150-160° C. |
| Storage | 4 h at room temperature |
| Stage 3 | |
| Settings | |
| Mixing assembly | As in stage 1, except: |
| Rotation rate | 40 min$^{-1}$ |
| Fill level | 0.51 |
| Chamber temp. | 50° C. |
| Mixing procedure | |
| 0 to 0.5 min | Break up stage 2 batch |
| 0.5 to 2 min | Add components of stage 3 |
| 2 min | Discharge and form sheet on laboratory mixing rolls (diameter 200 mm, length 450 mm, chamber temperature 50° C.) Homogenization: Cut the material 3 times towards the right and 3 times towards the left and 3 times with narrow nip (3 mm) and peel milled sheet away. |
| Batch temp. | 90-110° C. |

Table 3 collates the methods for rubber testing.

TABLE 3

| Physical testing | Standard/conditions |
|---|---|
| Mooney Scorch Time | Din 53523 |
| Tensile Strength (6 rings), Modulus 500%, Elongation at break | DIN 53504 |
| MTS, 16 Hz, 50 N +/− 25 N | DIN 53513 |

Table 4 shows the results of the tested compounds.

TABLE 4

| | Unit | Mixture 1 | Mixture 2 | Mixture 3 |
|---|---|---|---|---|
| Mooney Scorch t5 | [min] | 5.0 | 19.3 | 11.9 |
| Mooney Scorch t35 | [min] | 7.4 | 45.2 | 18.1 |
| Tensile strength (6 rings) | [MPa] | 11.9 | 11.7 | 12.5 |
| Modulus 500% | [MPa] | — | 8.9 | 10.0 |
| Elongation at break | [%] | 492 | 698 | 664 |
| MTS, E* 0° C. | [MPa] | 12.1 | 37.0 | 67.7 |
| MTS, E* 60° C. | [MPa] | 8.1 | 17.1 | 40.8 |
| MTS, tanδ 0° C. | [—] | 0.227 | 0.244 | 0.142 |
| MTS, tanδ 60° C. | [—] | 0.167 | 0.178 | 0.086 |

As can be seen from the data in table 4, mixture 3 containing a silicon containing azodicarbamide of the general formula I leads to an outstanding improved dynamic behaviour with a significant lower hysteresis loss. The Mooney scorch is improved in comparison to the carbon black compound. Mixture 3 containing an azodicarbamide of the general formula I shows even an improvement in the reinforcement with an improved tensile strength, a higher modulus 500% and an elongation at break on a high level.

What is claimed is:
1. A rubber mixture, consisting of:
(A) a selected from the group consisting of ethylene-propylene-diene copolymer (EPDM), ethylene-propylene copolymer (EPM), chloroprene rubber (CR), chlo- ropolyethylene (CM), chlorosulfonyl polyethylene (CSM), ethylene-vinyl acetate copolymer (EAM), alkyl acrylate copolymer (ACM), polyester polyurethane (AU), polyether polyurethane (EU), polychlorotrifluoroethylene (CFM), isobutene rubber (IM), thermoplastic polyester polyurethane (YAU), thermoplastic polyether polyurethane (YEU), silicone rubber with methyl groups on the polymer chain (MQ), hydrogenated acrylonitrile-butadiene rubber (HNBR), acrylonitrile-butadiene rubber (NBR), and carboxylated acrylonitrile-butadiene (XNBR), (B) an oxidic filler, and (C) at least one silicon containing azodicarbamide of the general formula I $$(R^1)_{3-a}(R^2)_a Si-R^1-NH-C(O)-N=N-C(O)-NH-R^1-Si(R^1)_{3-a}(R^2)_a \quad (I),$$

where $R^1$ are independent from each other, substituted or unsubstituted C1-C18-alkyl groups, C5-C18-cycloalkyl groups, or C6-C18-aryl groups, $R^2$ is independent from each other, a —OH, a substituted or unsubstituted C1-C18-alkoxy group, a C5-C18-cycloalkoxy group, or an alkyl polyether group $O(CH_2-CH_2-O)_n-R^3$ or $O(CH(CH_3)-CH_2-O)_n-R^3$, where the average of n is from 1 to 18 and $R^3$ is mutually independently a branched or unbranched, saturated or unsaturated monovalent C1-C32-hydrocarbon chain, $R^1$ is a branched or unbranched saturated or unsaturated, aliphatic, aromatic or mixed aliphatic/aromatic, divalent C1-C30-hydrocarbon which can be substituted with F—, Cl—, Br—, I—, —CN or HS—, a=1, 2 or 3 independent from each other, and optionally reaction accelerators, antioxidants, heat stabilizers, light stabilizers, anti-ozonants, plasticizers, tackifiers, blowing agents, dyes, pigiments, waxes, extenders, organic acids, retarders, metal oxides, or activators.

2. The rubber mixture as claimed in claim 1, wherein the rubber is ethylene-propylene-diene copolymer.

3. The rubber mixture as claimed in claim 1, wherein the silicon containing azodicarbamide is a mixture of silicon containing azodicarbamides of general formula I.

4. The rubber mixture as claimed in claim 1, wherein the silicon containing azodicarbamide of the general formula I is absorbed onto an inert organic or inorganic carrier.

5. The rubber mixture as claimed in claim 1, wherein the silicon containing azodicarbamide is:

$(EtO)_3Si-CH_2-NH-CO-N=N-CO-NH-CH_2-Si(OEt)_3$, $(EtO)_3Si-CH_2-CH_2-NH-CO-N=N-CO-NH-CH_2-CH_2-Si(OEt)_3$, $(EtO)_3Si-CH_2-CH_2-CH_2-NH-CO-N=N-CO-NH-CH_2-CH_2-CH_2-Si(OEt)_3$, $(EtO)_3Si-CH_2-CH_2-CH_2-CH_2-NH-CO-N=N-CO-NH-CH_2-CH_2-CH_2-CH_2-Si(OEt)_3$, $(EtO)_3Si-(CH_2)_{11}-NH-CO-N=N-CO-NH-(CH_2)_{11}-Si(OEt)_3$, $(EtO)_3Si-(CH_2)_{12}-NH-CO-N=N-CO-NH-(CH_2)_{12}-Si(OEt)_3$, $(EtO)_3Si-CH_2CH(CH_3)CH_2-NH-CO-N=N-CO-NH-CH_2CH(CH_3)CH_2-Si(OEt)_3$, $(EtO)_3Si-CH_2-CH_2-C_6H_4-CH_2-NH-CO-N=N-CO-NH-CH_2-C_6H_4-CH_2-CH_2-Si(OEt)_3$, $(EtO)_3Si-CH_2-CH_2-C_6H_4-NH-CO-N=N-CO-NH-C_6H_4-CH_2-CH_2-Si(OEt)_3$, $(MeO)_3Si-CH_2-NH-CO-N=N-CO-NH-CH_2-Si(OMe)_3$, $(MeO)_3Si-CH_2-CH_2-NH-CO-N=N-CO-NH-CH_2-CH_2-Si(OMe)_3$, $(MeO)_3Si-CH_2-CH_2-CH_2-NH-CO-N=N-CO-NH-CH_2-CH_2-CH_2-Si(OMe)_3$, $(MeO)_3Si-CH_2-CH_2-CH_2-CH_2-NH-CO-N=N-CO-NH-CH_2-CH_2-CH_2-CH_2-Si(OMe)_3$, $(MeO)_3Si-(CH_2)_{11}-NH-CO-N=N-CO-NH-(CH_2)_{11}-Si(OMe)_3$, $(MeO)_3Si-(CH_2)_{12}-NH-CO-N=N-CO-NH-(CH_2)_{12}-Si(OMe)_3$, $(MeO)_3Si-CH_2CH(CH_3)CH_2-NH-CO-N=N-CO-NH-CH_2CH(CH_3)CH_2-Si(OMe)_3$, $(MeO)_3Si-CH_2-CH_2-C_6H_4-CH_2-NH-CO-N=N-CO-NH-CH_2-C_6H_4-CH_2-CH_2-Si(OMe)_3$, $(MeO)_3Si-CH_2-CH_2-C_6H_4-NH-CO-N=N-CO-NH-C_6H_4-CH_2-CH_2-Si(OMe)_3$, $(EtO)(RO)_2Si-CH_2-CH_2-CH_2-NH-CO-N=N-CO-NH-CH_2-CH_2-CH_2-Si(EtO)(RO)_2$, $(RO)(EtO)_2Si-CH_2-CH_2-CH_2-NH-CO-N=N-CO-NH-CH_2-CH_2-CH_2-Si(RO)(EtO)_2$ or mixtures thereof, wherein Me=methyl, Et=ethyl and R=$C_{13}H_{27}(OCH_2CH_2)_5$.

6. A process for the production of the rubber mixture as claimed in claim 1, comprising mixing at least one rubber selected from the group of ethylene-propylene-diene copolymer (EPDM), ethylene-propylene copolymer (EPM), chloroprene rubber (CR), chloropolyethylene (CM), chlorosulfonyl polyethylene (CSM), ethylene-vinyl acetate copolymer (EAM), alkyl acrylate copolymer (ACM), polyester polyurethane (AU), polyether polyurethane (EU), polychlorotrifluoroethylene (CFM), isobutene rubber (IM), thermoplastic polyester polyurethane (YAU), thermoplastic polyether polyurethane (YEU), silicone rubber with methyl groups on the polymer chain (MQ), hydrogenated acrylonitrile-butadiene rubber (HNBR), acrylonitrile-butadiene rubber (NBR) or carboxylated acrylonitrile-butadiene rubber (XNBR), preferably ethylene-propylene-diene copolymer (EPDM), with at least one oxidic filler, and at least one silicon containing azodicarbamide of the general formula I.

7. A molding comprising a rubber mixture as claimed in claim 1.

8. A method of producing a product selected from the group consisting of seals, weatherseals, door seals, window seals, trunk seals, hood seals, vibrators, glass-run channels, radiators, hoses, garden and appliance hoses, tubings, washers, belts, electrical insulations, speaker cone surrounds, electrical cable-jointings, profiles, outer casing on wires, roofing membranes, geomembranes, pneumatic spring systems, roller coverings, conveyor belts, rubber mechanical goods, plastic impact modifications, thermoplastic, cooling system circuit hoses and charge air tubings on turbo charged engines, comprising utilizing the rubber mixture of claim 1.

9. A method of producing moldings which comprises utilizing the rubber mixture of claim 1.

10. A product selected from the group consisting of seals, weatherseals, door seals, window seals, trunk seals, hood seals, vibrators, glass-run channels, radiators, hoses, garden and appliance hoses, tubings, washers, belts, electrical insulations, speaker cone surrounds, electrical cable-jointings, profiles, outer casing on wires, roofing membranes, geomembranes, pneumatic spring systems, roller coverings, conveyor belts, rubber mechanical goods, plastic impact modifications, thermoplastic, cooling system circuit hoses and charge air tubings on turbo charged engines, comprising the rubber mixture of claim 1.

* * * * *